(12) United States Patent
Kaneda et al.

(10) Patent No.: US 8,904,129 B2
(45) Date of Patent: Dec. 2, 2014

(54) METHOD AND APPARATUS FOR BACKUP AND RESTORE IN A DYNAMIC CHUNK ALLOCATION STORAGE SYSTEM

(75) Inventors: Yasunori Kaneda, San Jose, CA (US); Junichi Hara, San Jose, CA (US); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/347,040

(22) Filed: Jan. 10, 2012

(65) Prior Publication Data

US 2012/0117345 A1    May 10, 2012

Related U.S. Application Data

(63) Continuation of application No. 11/602,968, filed on Nov. 22, 2006, now Pat. No. 8,117,409.

(51) Int. Cl.
*G06F 12/00* (2006.01)
*G06F 11/14* (2006.01)

(52) U.S. Cl.
CPC ........ *G06F 11/1451* (2013.01); *G06F 11/1456* (2013.01); *G06F 11/1469* (2013.01)
USPC .......................................... 711/162; 711/154

(58) Field of Classification Search
USPC ...................................................... 711/162
See application file for complete search history.

(56) References Cited

U.S. PATENT DOCUMENTS

| | | |
|---|---|---|
| 6,209,002 B1 | 3/2001 | Gagne et al. |
| 2004/0088505 A1 | 5/2004 | Watanabe |
| 2004/0162958 A1 | 8/2004 | Kano et al. |
| 2004/0268070 A1 | 12/2004 | Hasegawa |
| 2005/0086443 A1 | 4/2005 | Mizuno et al. |
| 2005/0182890 A1 | 8/2005 | Yamagami |
| 2007/0174673 A1* | 7/2007 | Kawaguchi et al. ............. 714/6 |
| 2007/0226446 A1 | 9/2007 | Horiuchi et al. |

FOREIGN PATENT DOCUMENTS

| | | |
|---|---|---|
| JP | 2002-140168 | 5/2002 |
| JP | 2004-280779 A | 10/2004 |
| JP | 2005-18233 A | 1/2005 |
| JP | 2005-135116 | 5/2005 |
| JP | 2005-234820 A | 9/2005 |
| JP | 2007-199922 A | 8/2007 |

\* cited by examiner

*Primary Examiner* — April Y Blair
*Assistant Examiner* — Prasith Thammavong
(74) *Attorney, Agent, or Firm* — Mattingly & Malur, PC

(57) ABSTRACT

Backup and restore operations are made possible in a storage system that has dynamic chunk allocation (DCA) capability. In a DCA storage system, a chunk of physical storage area is not allocated to a segment of a volume until a write command is received targeting the segment of the volume. During a restore operation of the volume in the DCA storage system, the wasting of storage capacity when a backup image of the volume is restored is mitigated by preventing allocation of physical storage areas to segments of restore data that are only void data.

9 Claims, 17 Drawing Sheets

FIG. 3 Chunk Pool Management Table

| Segment Number | IsAllocated | Chunk Number |
|---|---|---|
| 0 | | |
| 1 | | |
| 2 | ✓ | 10000 |
| 3 | | |
| : | | |

FIG. 4 Chunk Table

FIG. 8

| WRITE | |
|---|---|
| LBA | 9 |
| Blocks (number of blocks) | 2 |
| Data 1 (512bytes) | |
| Data 2 (512 bytes) | |

1921 — LBA
1922 — Blocks
1923 — Data 1
1924 — Data 2
192

FIG. 9A

| READ | |
|---|---|
| LBA | 9 |
| Blocks (number of blocks) | 1 |

1961 — LBA
1962 — Blocks
196-A

FIG. 9B

| READ | |
|---|---|
| LBA | 0 |
| Blocks (number of blocks) | 1 |

1961 — LBA
1962 — Blocks
196-B

METHOD AND APPARATUS FOR BACKUP AND RESTORE IN A DYNAMIC CHUNK ALLOCATION STORAGE SYSTEM

CROSS-REFERENCES

This is a continuation application of U.S. Ser. No. 11/602,968, filed Nov. 22, 2006 (now U.S. Pat. No. 8,117,409).

BACKGROUND OF THE INVENTION

1. Field of the Invention

The present invention relates generally to storage systems.

2. Description of Related Art

To reduce the waste of physical blocks in storage volumes, storage systems have been developed that utilize dynamic chunk allocation (DCA) capability (also referred to as "dynamic capacity allocation" or "thin provisioning storage systems"). Under DCA technology, a logical volume is allocated for use by one or more host computers for storing data, but no physical blocks of storage are initially allocated to the volume. Instead, when the storage system receives a write command from a host directed to an area of the volume that has not yet had physical storage capacity allocated to it, the storage system allocates an area of physical storage space (commonly referred to as a storage "chunk") from a pool of available physical storage areas (i.e., a storage chunk pool). The chunk of storage capacity is a physical storage area composed of one or more physical blocks of storage space on one or more storage devices, such as hard disk drives. When an allocated physical storage area already exists for a portion of a thin-provisioned volume, this indicates that data has already been written to that portion of the volume by a host computer at least one time. In some embodiments, a thin-provisioned volume might also be considered a type of a virtual volume in its initial state, since a large volume capacity is presented to the user, but actual physical storage space has not yet been allocated for this volume.

DCA storage is able to reduce waste of physical blocks in a storage system because the physical blocks are only allocated when writing of data actually takes place. If the storage system receives no write command to certain ranges or segments of the thin provisioned volume, then physical data blocks are not actually allocated to those portions of the volume. This is different from conventional storage systems in which a volume is allocated as having a certain amount of physical storage space when the volume is created. Thus, conventional storage systems that do not incorporate dynamic capacity allocation capability usually have large amounts of unused physical data blocks (i.e., wasted physical blocks) allocated to volumes in the system even though no data is stored in those blocks.

US Patent Application Publication 20040162958, to Yoshiki Kano et al., entitled "Automated On-Line Expansion Method for Storage Device", filed Feb. 23, 2004, the disclosure of which is incorporated herein by reference, discloses such a storage system that includes automated on-line capacity expansion capability that dynamically allocates storage chunks to a volume as areas of the volume receive write commands. However, this prior art does not disclose any backup or restore methods for use in protecting data in such thin-provisioned volumes in DCA storage systems. Therefore, as is described in more detail below, waste storage chunks may be allocated in the storage system when a backup image is used to restore data to the storage system.

As is well known, periodic backup of stored data is necessary for protecting the data in case of disk failure, catastrophe, or the like. When data is lost or erased, or when a storage device fails, the missing data is typically recovered by restoring data from a backup image created at some earlier point in time. Typically, when performing a volume-level backup, a backup computer reads data from the volume being backed up, and writes the data to a tape or other backup medium. During the backup process, the backup computer reads the volume from the beginning to the end, while writing the data thus read to the backup medium. However, when this conventional backup technique is applied to a volume on a storage system that utilizes DCA capability, the backup program attempts to read data from areas (segments) of the volume that have not yet had physical storage space allocated to them. In response, the storage system typically responds with a default void data pattern when the backup computer attempts to read data on each segment of the volume that has not yet had physical storage space allocated to it. In a case where the thin provisioned volume is quite large, and has used only a small percentage of the capacity allocated to physical storage areas, a large amount of the backed up data can be this default data pattern. Consequently, on the backup image of the volume, a large amount of the backed-up data might be wasted space because normally whole volume images are stored during data backup using conventional backup software.

Furthermore, when this backed-up volume image is used in a volume-level restore operation, the backup computer reads data from the backup medium and writes the data to the restored volume in the DCA storage system. The backup computer conventionally restores a volume by writing the volume from beginning to end. Thus, the whole backup image is used to rebuild the volume, which defeats the purpose of dynamic chunk allocation capability because the backup computer issues write commands to all the allocated address blocks in the volume, thereby allocating blocks to the volume even though they are filled with null data of the default data pattern, which can result in unnecessary wasting of large amounts of physical storage space.

BRIEF SUMMARY OF THE INVENTION

The invention is related to a method and apparatus for data backup and restore for a storage system. The invention is suitable for use with a storage system that has dynamic chunk allocation (DCA) capability in which a chunk of physical storage space is allocated when a write command to a volume is received if a physical storage area has not already been allocated to the designated portion of the volume. Embodiments of the invention provide methods and apparatuses for mitigating the wasting of storage capacity when a backup image of a volume is restored in a DCA storage system. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 3 illustrates a chunk pool management table.

FIG. 4 illustrates a chunk table for a volume.

FIG. 8 illustrates an example of a WRITE command.

FIGS. 9A and 9B illustrate examples of READ commands.

DETAILED DESCRIPTION OF THE INVENTION

Figure 1A:
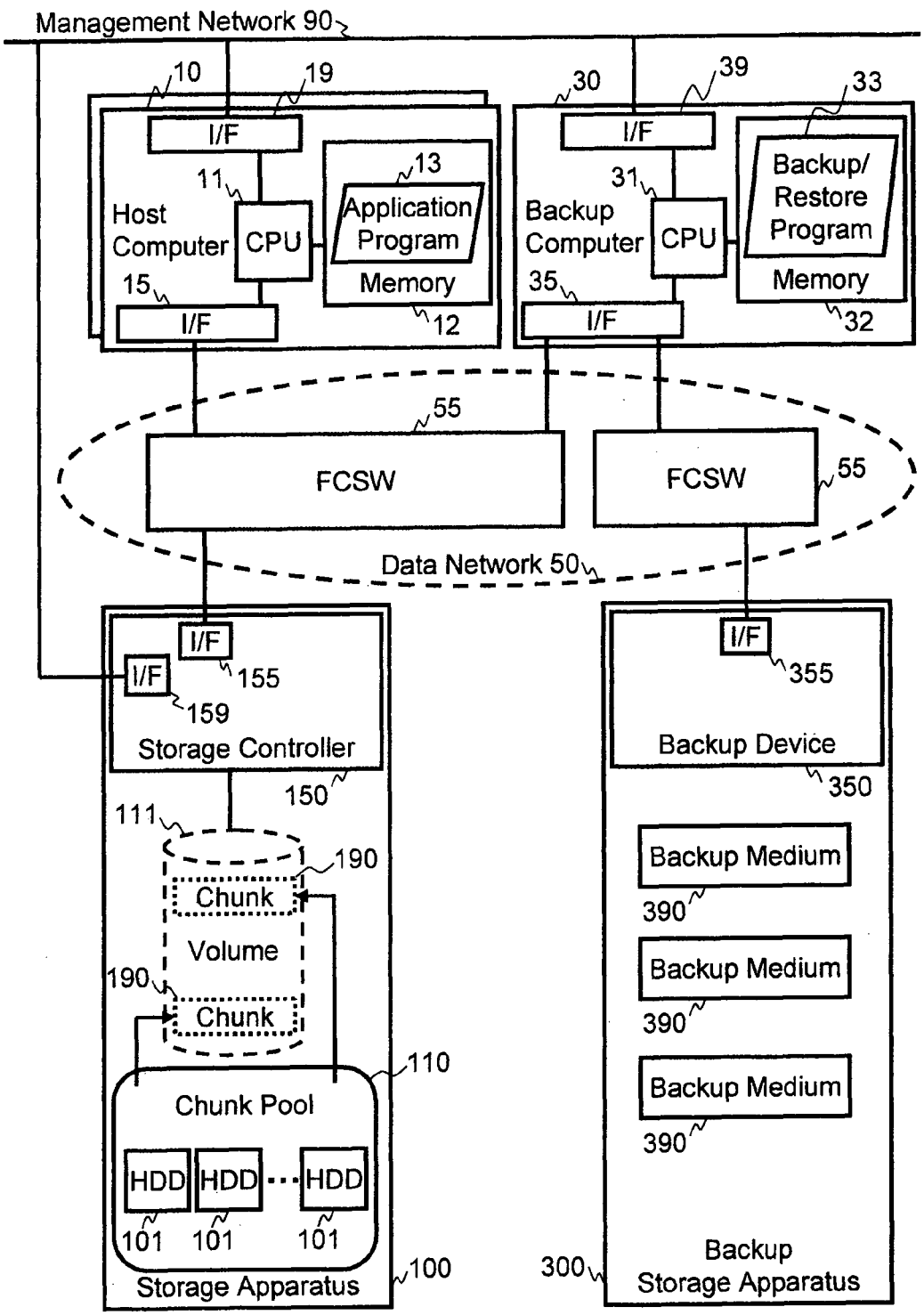
FIG. 1A illustrates an example of a hardware architecture in which a method of the invention may be applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

In exemplary embodiments, the system of the invention is composed of a host computer, a backup computer, a backup storage apparatus and a storage system that has dynamic chunk allocation capability. In these embodiments, the storage system, which has dynamic chunk allocation (DCA—also referred to as "dynamic capacity allocation") capability, may be referred to as a DCA storage system. The DCA storage system includes one or more logical volumes (also referred to as "thin provisioned volumes" or "DCA volumes"), which can store data written by a computer, a chunk pool for holding unused storage chunks, a chunk pool management table for managing unused storage chunks, and a chunk table for managing allocated storage chunks in the volume.

When a volume in a DCA storage system is first created, it initially as has either no storage chunks allocated to it, or possibly a specified minimum number of chunks. The volume is logically divided into a plurality of segments to which chunks may be independently allocated. The segments are able to be identified by one or more logical block addresses (LBA) to enable a computer to read data from individual segments, or write data to individual segments. When the DCA storage system receives a write command from a host computer targeting the volume, the DCA storage system determines whether or not the write command is directed to a segment of the volume for which a physical storage area has already been allocated on the storage devices. If a physical storage area (i.e., a chunk of storage) has already been allocated for the segment of the volume that is the target of the write command, then the DCA storage system is able to store the write data to the allocated physical storage area. However, if the write command is directed to a segment of the volume for which storage space has not yet been allocated, then the DCA storage system must allocate physical storage space to that portion of volume that is targeted by the write command. Thus, one or more chunks are allocated from the chunk pool when the DCA storage receives a write command that targets a portion of the volume that has not yet had physical storage allocated to it. Following chunk allocation, the DCA storage system then stores the write data associated with the write command to the newly-allocated storage chunk. Also, a chunk table in the DCA storage system is updated and holds the segment status for the volume. However, often there remain large portions of the volume that have not yet had physical storage areas allocated to them. To prohibit generating wasted physical blocks (i.e., wasted chunks) in a volume when a backup image of the volume is restored, any of three embodiments of the invention may be used.

First Embodiments

Avoiding a Write Command if a Chunk was Not Originally Allocated

Under the first embodiments, the DCA storage system has a chunk table import/export program, a mode select program and a "mode check" step in the dynamic chunk allocation program. The backup computer downloads a copy of a chunk table at a point in time by invoking a chunk table import/export program, and stores the chunk table in the backup storage apparatus. Next, during a backup operation, the backup computer backs up all the data in the volume to the backup storage apparatus to create a point-in-time backup image of the data in the volume that corresponds to the point-in-time copy of the chunk table. The backup storage apparatus maintains a relationship between the copy of the chunk table obtained from the DCA storage system and the backup image stored to the backup apparatus. Then, in the case of a restore operation, the backup computer uploads the copy of the chunk table to the storage apparatus and selects a "restore mode" in the dynamic chunk allocation program on the storage apparatus before restoring the backup image. The storage apparatus uses the uploaded copy of the chunk table as the current chunk table for the volume, and the backup computer starts restoring the backup image to the DCA storage. When the DCA storage receives a write command from the backup computer, a mode check step checks the chunk table while a restore mode is selected. If the chunk table shows that no chunk was allocated at the targeted write position, then the DCA storage avoids the write command. The backup computer resets the DCA storage to a "standard mode" when the restore operation is completed.

Second Embodiments

Avoiding Chunk Allocation when Void Data is Detected in the Backup Image Being Restored In the second embodiments, the DCA storage system includes a "void data" detecting step in the dynamic chunk allocation program. In the case of a restore operation, the backup computer restores the backup image. The DCA storage system receives write commands including data to be restored (i.e., data that is part of backup image). The default void data detecting step in the dynamic chunk allocation program checks the data in the write commands to determine if the data is a void data pattern (also referred to as "null data" or "default data pattern"). If the checked data is determined to be the default void data pattern, such as by comparing the received data with a pattern contained in a default data image holding table, then the DCA storage apparatus avoids chunk allocation for that portion of the restored volume (i.e., the segment(s) designated by the write command).

Third Embodiments

No Data Transfer to the Backup Computer when a Segment Does Not Have a Chunk Allocated In the third embodiments, the DCA storage system includes a mode select program and a no-data-transfer step. The DCA storage apparatus is set to a "backup mode" before beginning a backup operation. In the backup mode, the DCA storage system responds with a no data transfer condition to the backup computer when a read occurs on a segment of a volume that has not yet had storage chunks allocated to it. Then, during a restore operation, data is restored only to segments of the volume that were stored in the backup image. All of these embodiments are discussed in more detail below.

First Embodiments

System Configuration

FIG. 1A illustrates an example of an information system overview in which the methods of the invention may be applied. The information system includes one or more host computers 10, or other device, that is able to store data to a storage apparatus 100 via a data network 50. The host computer 10 is able to issue write commands and read commands to the storage apparatus 100. Thus, data generated by the host computer 10 may be written to the storage apparatus 100 for storage, and data in the storage apparatus 100 may be read out to the host computer 10. At least one backup computer 30 is connected to the storage apparatus 100 via the data network 50, and is also connected to a backup storage apparatus 300 via the data network 50.

Storage apparatus 100 includes a storage controller 150 in communication with one or more storage devices, such as hard disk drives (HDDs) 101, or other equivalent storage devices, such as optical drives, solid state storage, etc. Storage controller 150 may apply a RAID or other array algorithm for protecting data stored in the HDDs 101. The storage apparatus 100 is configured to provide one or more chunk pools 110, each of which is composed of one or more of HDDs 101. The storage apparatus 100 is able to provide one or more volumes 111 for use by the host computer 10 for storing data. In this embodiment, the storage apparatus 100 has a dynamic chunk allocation program 160 (FIG. 1B), so volume 111 is show as a dotted line in the FIG. 1 to represent the physical storage space is not initially allocated for the entire volume 111 when the volume is created. Thus, host computer 10 is able to recognize volume 111 as having a specified size; however no chunks of storage need to be initially allocated to volume 111. As will be discussed additionally below with respect to FIG. 2 a storage chunk 190 is composed of one or more physical blocks in the HDD 101. To store write data transferred from the host computer 10, the dynamic chunk allocation program 160 allocates an appropriate number of storage chunks 190 to volume 111 when the storage controller 150 receives the write command from the host computer 10 if a storage chunk 190 has not yet been allocated for the segment of volume 111 targeted by the write command.

The at least one backup storage apparatus 300 includes one or more backup devices 350 and one or more backup media 390. In embodiments where backup device 350 is a tape device, and the backup medium 390 is a tape, backup storage apparatus 300 may have one or more storage slots (not shown), which can hold tape media when not in use, and a mechanical mechanism (not shown) to transport the tape media between the tape device and the storage slots. Alternatively to a tape device and tape media, other types of backup storage media 390, such as optical disks or HDDs may be used in some embodiments of the invention.

As mentioned above, host computer 10, backup computer 30, storage apparatus 100 and backup storage apparatus 300 are connected for communication via data network 50. Data network 50 in this embodiment uses Fibre Channel (FC). However, other network types, such as Ethernet, etc., may also be used. Network switches and hubs can be used for connecting the elements of the information system. In FIG. 1A, plural Fibre Channel switches (FCSW) 55 are incorporated into data network 50 for connecting the elements of the information system, although other connection equipment may also be used. Host computer 10, backup computer 30, storage apparatus 100 and backup storage apparatus 300 include one or more FC interfaces (I/Fs) 15, 35, 155 and 355, respectively, for connecting to data network 50.

Host computer 10, backup computer 30 and storage apparatus 100 may also be connected for communication via a management network 90. Management network 90 in this embodiment may use Ethernet, but other network types may also be used. Network switches and hubs (not shown) can be included in network 90 for connecting the system elements. Host computer 10, backup computer 30 and storage apparatus 100 have one or more Ethernet I/Fs 19, 39 and 159, respectively, for enabling connection to management network 90.

Each host computer 10 may include a memory 12 for storing programs and data, a CPU 11 for executing programs stored in memory 12, I/F 15 for enabling communication with the data network 50, and I/F 19 for communication with the management network 90. At least one application program 13 may be loaded into memory 12 and executed by CPU 11 for producing write data to be stored to the storage apparatus 100.

Backup computer 30 may include a memory 32 for storing the programs and data, a CPU 31 for executing programs stored in memory 32, I/F 35 for connecting to the data network 50, and I/F 39 for connecting to the management network 90. At least one backup/restore program 33 is loaded into the memory 32 and executed by CPU 31.

Figure 1B:
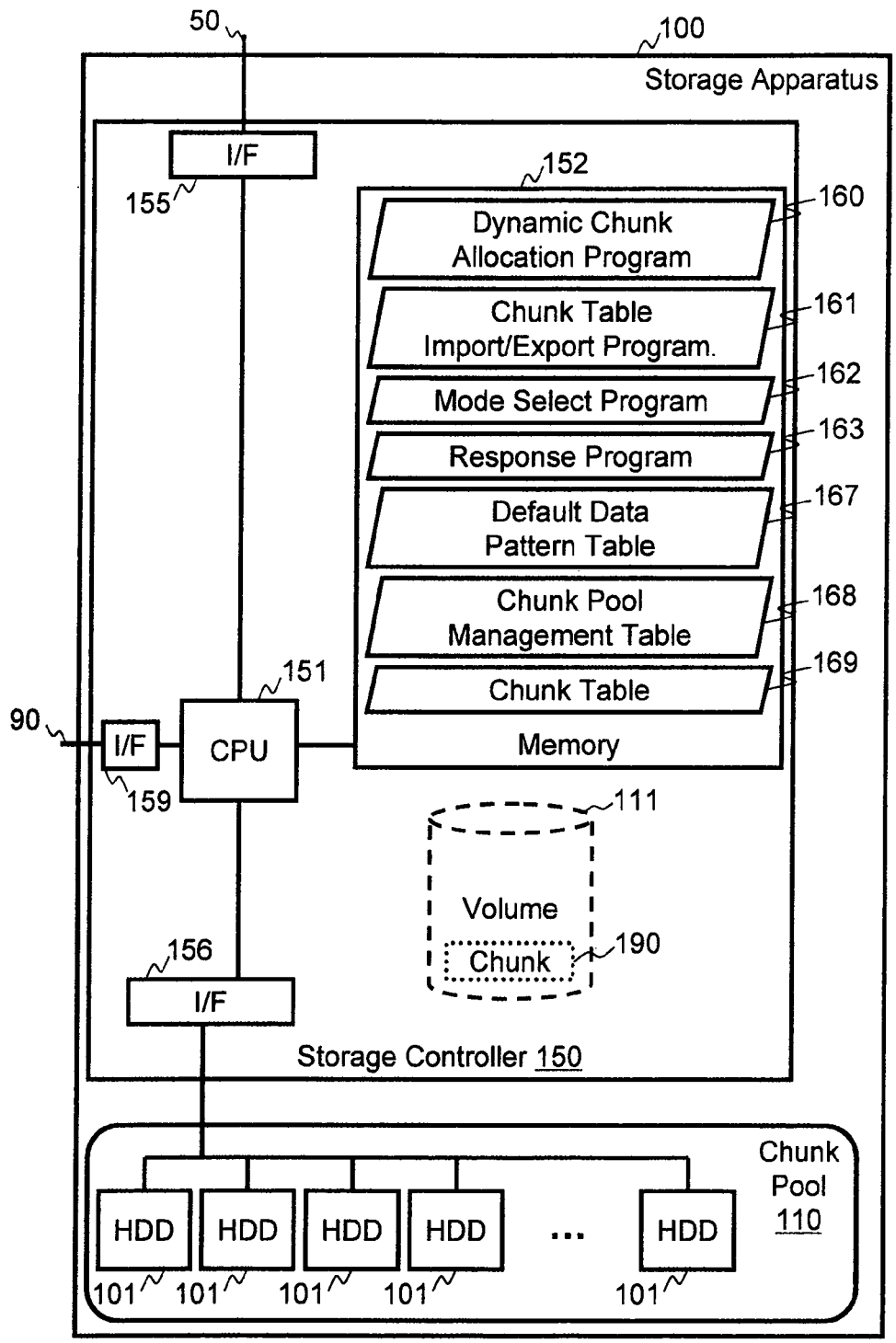
FIG. 1B illustrates an exemplary arrangement of a storage apparatus of the invention.

FIG. 1B illustrates additional features of the storage apparatus 100, which includes one or more HDDs 101 in communication with storage controller 150 for providing one or more storage volumes composed of one or more storage chunks 190. Each chunk 190 is a physical storage area composed of one or more physical blocks in one or more of HDDs 101. Preferably, redundant data may be stored in the HDDs 101 for improving data reliability. One or more volumes 111 (this embodiment illustrates one volume 111 in the storage apparatus 100) are made up of one or more chunks 190 from chunk pool 110. Storage controller 150 includes a memory 152 for storing programs and data, a CPU 151 for executing programs stored in memory 152, I/F 155 for connecting to data network 50, and I/F 159 for connecting to the management network 90. Storage controller 150 also includes an I/F 156 for connecting to HDDs 101. I/F 156 may be a SATA interface if SATA HDDs are used as HDDs 101, or may be FC, SCSI, SAS or other appropriate interface depending on the type of HDDs implemented. Programs and data structures may be loaded into memory 152 (or stored on other computer readable medium) and executed or used by CPU 151 for achieving aspects of the invention, as are described in greater detail below.

In the preferred embodiments for a DCA storage system, the storage controller 150 executes a dynamic chunk allocation program 160 for allocating storage chunks 190 to volume 111 from the chunk pool 110 when it is necessary for a new chunk to be allocated. However, it is conceivable that other means may be arrived at for dynamically allocating storage to a volume. Accordingly, the invention is not limited to a particular method for dynamic chunk allocation.

Storage controller 150 may also include: a response program 163 for responding to READ, WRITE, or READ CAPACITY commands from the host computer 10; a default data pattern table 167 for holding a default data pattern for responding to a READ command directed to a segment of a volume that does not have a storage chunk allocated to it; and a chunk pool management table 168 for managing used and unused storage chunks in the chunk pool 110. The invention uses a chunk table 169 that may be maintained by controller 150 for keeping track of chunk allocation status for each volume 111, i.e., each volume 111 may have a chunk table 169 maintained for it that indicates which segments of the volume have had chunks allocated, as will be described further below. Also a chunk table import/export program 161 may be included in some embodiments to enable exporting of the chunk table to a computer, such as the backup computer, and importing the chunk table from a computer. Further, a mode select program 162 may be provided for selecting among modes, such as backup mode, restore mode, or standard mode, so that the controller may perform certain functions described further below.

Figure 2:
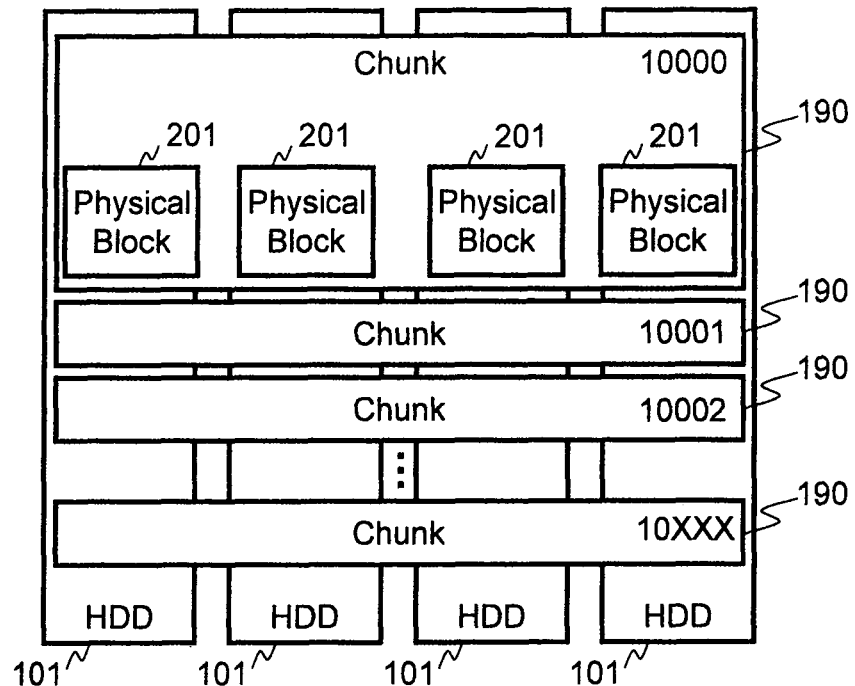
FIG. 2 illustrates an example of how storage chunks in a DCA storage system may be configured.

FIG. 2 illustrates one example of how the chunks 190 of the invention may be constructed. A storage chunk 190 is composed of the one or more physical blocks 201 in one or more HDDs 101. In the illustrated embodiment, a chunk is composed of four physical data blocks 201 on four different HDDs 101 concatenated to form a single allocated physical storage area. In this embodiment, for example, if each physical block 201 is able to hold 512 bytes of data, then one storage chunk 190 will be able to hold 2048 bytes. Of course, other chunk sizes may be used. Further, each chunk may be given a unique ID by controller 150 for identifying the chunk independently of the others. In some embodiments of DCA storage systems, the size of a storage chunk is the same size for each chunk in the particular storage system, and the volume 111 is divided into segments of a size that matches the chunk size, i.e., the size of a volume segment equals the size of one chunk. Additionally, if multiple HDDs are arranged in an array group, such as in a RAID configuration, then some of the HDDs may be used to store data, while another HDD may be used to hold parity data for the chunk. Many such chunk configuration arrangements will be apparent to those of skill in the art in light of the foregoing.

FIG. 3 illustrates the chunk pool management table 168. The chunk pool management table 168 is composed of three rows: "Chunk Number" row 16801; "IsAllocated" row 16802, and "Volume Number" row 16803. Chunk number row 16801 stores a unique chunk number for identifying each storage chunk 190. The "IsAllocated" row 16802 stores a status for each chunk indicating whether or not a particular chunk has been allocated to a volume. Volume number row 16803 stores a volume number when the chunk has been allocated that indicates which volume the chunk has been allocated to. Initially, there may exist a case in which no chunks in the chunk pool 110 have yet been allocated to a volume. When this occurs, all of the cells in row 16802 and row 16803 are initially NULL.

FIG. 4 illustrates chunk table 169 for volume 111. Chunk table 169 is an information maintained in the storage apparatus 100 that indicates which segments of volume 111 have physical storage areas (chunks) allocated to them. The chunk table 169 composed of three rows: "Segment Number" row 16901, "IsAllocated" row 16902, and "Chunk Number" row 16903. Segment number row 16901 stores a segment number for identifying a segment of volume 111. The designated capacity size of a segment is preferably equal to the capacity size of a storage chunk so that a chunk can be assigned to a segment of a volume. The "IsAllocated" row 16902 stores a status of whether or not a chunk has been allocated for a particular segment of the volume 111. Chunk number row 16903 stores a chunk number of a chunk when the chunk has been allocated to a particular segment in the volume. Initially, no chunks might be allocated to the volume, in which case, all cells in row 16902 and row 16903 are NULL.

Figure 5:
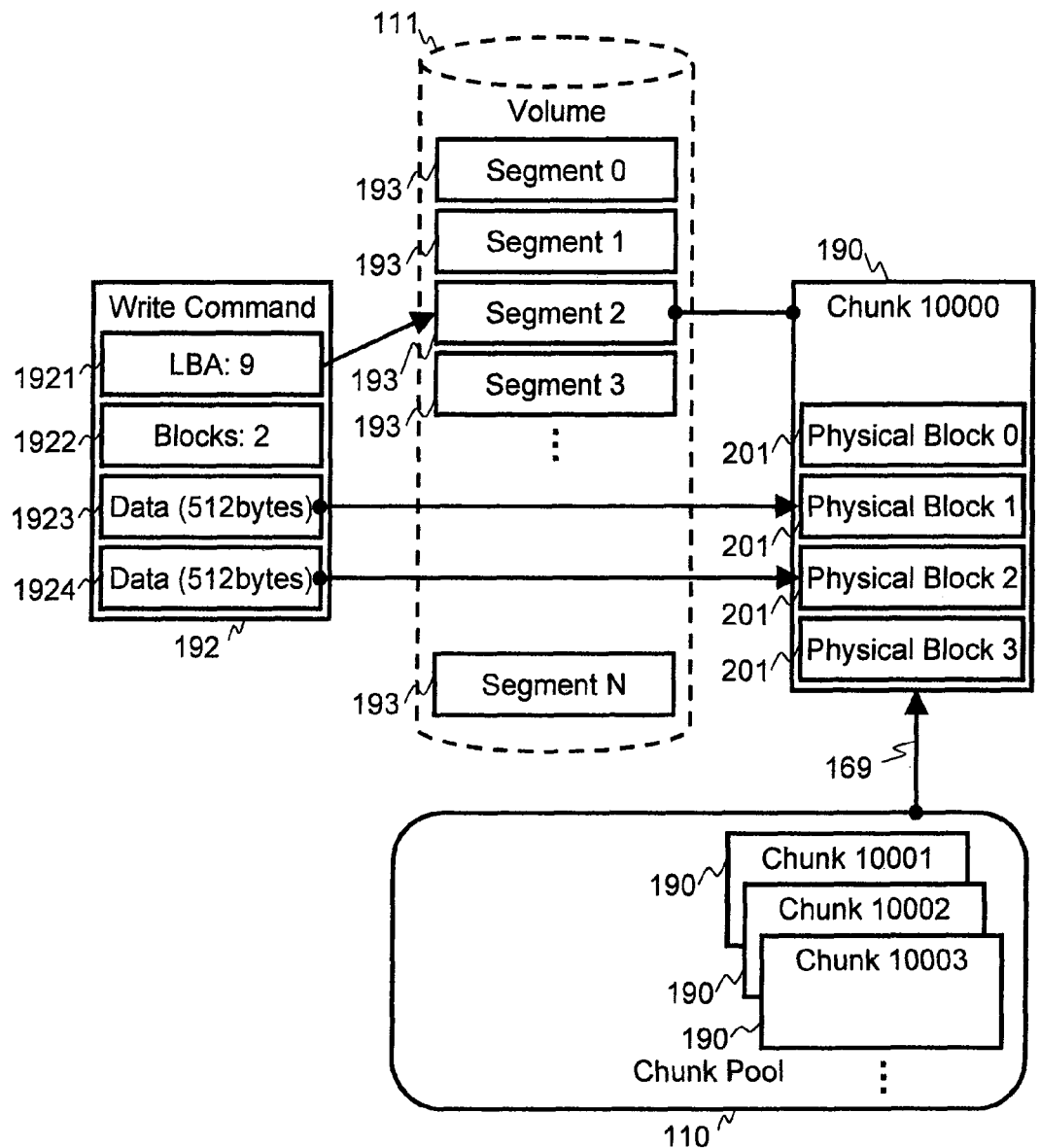
FIG. 5 illustrates a volume and the relationship among a write command, the volume, a storage chunk and the chunk pool.

FIG. 5 illustrates the volume 111 and a relationship among a write command 192, a chunk 190 and the chunk pool 110. The volume 111 is logically divided into plural segments 193. In this embodiment, each segment 193 is designated as 2048 bytes and each chunk contains 2048 bytes of physical storage, such as is illustrated in FIG. 2. Also, the storage controller 150 provides each segment 193 with a unique ID for identifying the segment independently of the others. This may be accomplished by numbering the segments sequentially from 0 to N, as illustrated, or by other identification process. Preferably, each segment is identifiable by on or more Logical Block Addresses (LBAs). Thus, in the example illustrated, segment "0" would include LBAs "0"-"3", segment "1" would include LBAs "4"-"7", segment "2" would include LBAs "8"-"11", and so forth. Each LBA in a segment may be correlated with a physical block in a chunk allocated to that segment. This enables a write command 192 to designate one or more LBAs for storing write data. FIG. 5 will be explained in greater detail below in conjunction with FIGS. 6-8. Further, while segments and chunks of 2048 bytes are used in the example, the invention is not limited to a particular segment or chunk size. For example, each chunk may be composed of only one physical block 201 of 512 bytes, and each segment might also be 512 bytes and there would then only be one LBA per segment. Numerous other variations are possible.

Figure 6:
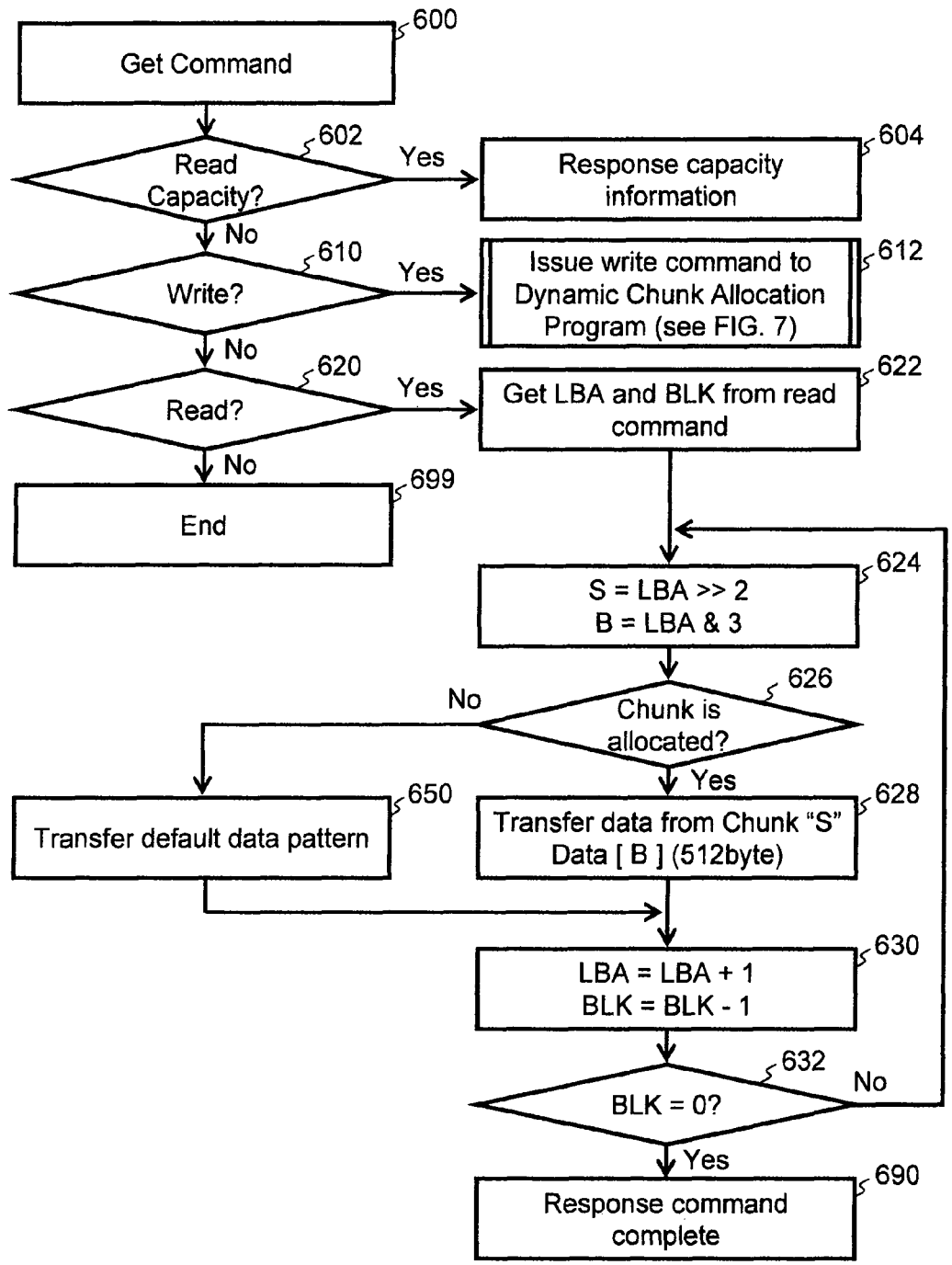
FIG. 6 illustrates a process flow in the response program in the storage apparatus.
Figure 7:
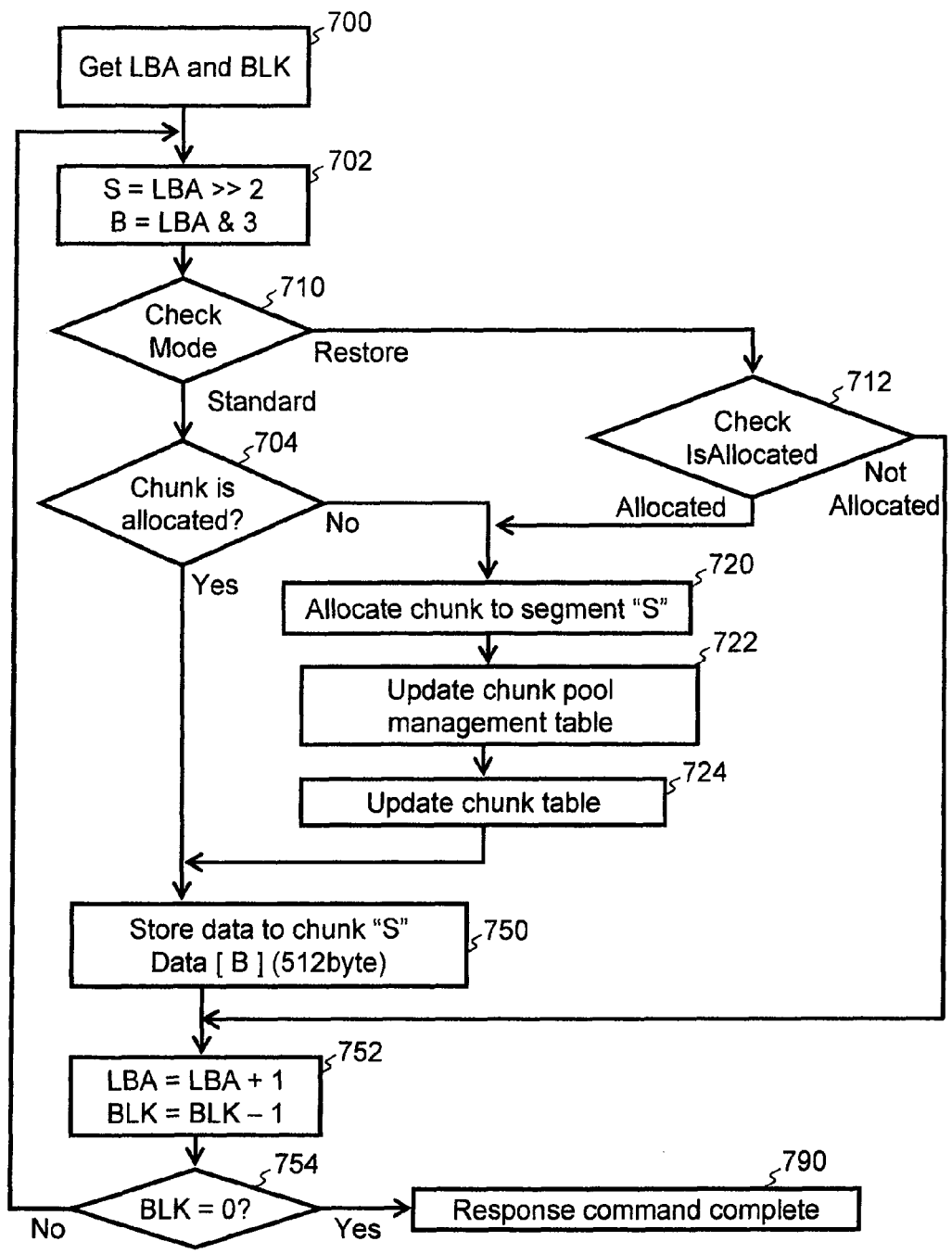
FIG. 7 illustrates a process flow in the dynamic chunk allocation program.

FIGS. 6 and 7 illustrate processes carried out by the storage controller in response to READ CAPACITY, WRITE, and READ commands received from a host computer 10. As mentioned above, the volume 111 typically may not have any chunks initially allocated. However host computer 10 is able to obtain capacity information from the storage apparatus 100 via response program 163. Response program 163 in storage controller 150 responds with capacity information to the host computer 10 as a result of receiving a READ CAPACITY command from the host computer 10. Further, if the command is a WRITE command, the controller 150 carries out the functions of the response program Steps 610-612 set forth in FIG. 6 and the dynamic chunk allocation program 160 set forth in FIG. 7. Additionally, if the command is a READ command, the storage controller carries out the process of the response program 163 set forth in Steps 620-699 of FIG. 6. The particular steps carried out by the storage controller 150 in the process flow in the response program 163 are set forth in FIG. 6 and described below.

READ CAPACITY Command

Step 600: The controller 150 receives a command from a computer.

Step 602: If the command is a READ CAPACITY command, then the process goes to step 604.

Step 604: The controller 150 responds with the capacity information to the computer that issued the request.

WRITE Command

Next, the process carried out when receiving a WRITE command is explained with reference to FIGS. 5, 6 and 7. FIG. 7 illustrates the process flow carried out by the dynamic chunk allocation program 160 in controller 150 when a WRITE command is received. Also, FIG. 8 illustrates an example of a WRITE command 192 for discussion purposes. In the example illustrated in FIG. 8, WRITE command 192 includes a logical block address (LBA) 1921, a number of blocks (BLK) 1922, a first block of data 1923, and a second block of data 1924. Thus, in this case the host computer 10 would like to write 1024 bytes of data (two blocks of data 1923, 1924) on LBAs 9 and 10.

Step 610: If the command is a WRITE command, then the process goes to step 612. If the command is not a WRITE command, then the process goes to step 620 for responding to a READ command, as discussed below.

Step 612: The response program 163 passes the WRITE command to the dynamic chunk allocation program 160 which carries out the process set forth in FIG. 7, and as described below.

Step 700: The controller gets the LBA 1921 and BLK (number of blocks) 1922 from the WRITE command. In the case illustrated in FIGS. 5 and 8, LBA is 9, and BLK is 2.

Step 702: The controller calculates "S" and "B", where "S" is the segment number corresponding to the LBA designated by the WRITE command and "B" is the physical block position in the segment. In this example, physical block size is 512 bytes, and segment size and chunk size are 2048 bytes. Thus, "S" is calculated by a two-bit right shift, and "B" is calculated by a two-bit mask. For LBA=9, then in this case, "S" is 2 and "B" is 1. As illustrated in FIG. 5, segment "2" of volume 111 is designated by the LBA of the write command, and physical block "1" of segment "2" is specified as the first block to be written to in segment "2".

Step 710: The process checks the mode setting to determine whether the mode is "standard" or "restore". The mode may be "standard" for normal write operations or "restore" during some restore operations under the invention. If the mode is standard, then the process goes to step 720. Otherwise, if the mode is "restore", the process goes to step 712. In this case, the mode is "standard", so the process goes to Step 704. The case for the "restore" mode is discussed below in the description of the restore process.

Step 704: The process checks whether the segment referred to by "S" already has a storage chunk allocated by referring to chunk table 169 for volume 111. If the specified segment has not yet had a storage chunk 190 allocated for it, then the process goes to Step 720; otherwise, the process goes to Step 750. In the example in FIG. 5, it will be assumed that the segment 2 has not yet had a chunk allocated.

Step 720: The process allocates a chunk 190 to the segment 193 from the chunk pool 110. If chunk allocation fails, such as may occur in the case of a lack of free chunks, then an error is responded to the host computer 10. In the example, chunk number "10000" is allocated to segment "2" in volume 111.

Step 722: The chunk pool management table 168 is updated. In this case, since chunk number "10000" is allocated to segment number "2" in volume 111, updated chunk pool management table 168 will appear as is illustrated in the FIG. 3, showing that chunk number 10000 is allocated to volume number 111.

Step 724: The chunk table 169 for volume 111 is then updated to show that a new chunk has been allocated to volume 111. The updated chunk table 169 will appear as is illustrated in FIG. 4, in which segment number 2 is shown as having chunk number 10000 allocated to it.

Step 750: The process stores the first 512 bytes data 1923 contained in the WRITE command 192 to one of the blocks in the allocated chunk 10000. In this case, "B" is equal to "1", so the first 512 bytes of data are stored in the second block (block "1") in storage chunk 10000, as illustrated in FIG. 5.

Step 752: To store the next block contained in the write command, the process adds one to LBA and subtracts one from BLK.

Step 754: The process checks whether BLK equals zero. If BLK is zero, then the process goes to step 790. If BLK is not equal to zero, then the process goes back to step 702. In this case, BLK is not zero since BLK originally equaled "2", and so BLK now equals "1".

Step 702: The process calculates "S" and "B" again. In this case, "S" is 2 and "B" is 2.

Step 710: The dynamic allocation program 160 checks the mode to determine whether the mode is "standard" or "restore". In this case, since mode is "standard", the process goes to Step 704.

Step 704: The process checks whether a chunk is already allocated for the designated segment. In this case, segment 2 already has a chunk allocated for it (chunk 10000), so the process goes to Step 750.

Step 750: In the example give, "B" is 2, so the second 512 bytes of write data 1924 is stored in the third block in the chunk 10000 (physical block number "2"), as illustrated in FIG. 5.

Step 752: The process adds one to the LBA and subtracts one from the BLK.

Step 754: The process checks whether BLK equals zero. In this case, BLK has now become zero, so the process goes to step 790.

Step 790: The process sends a response to the host computer 10 to indicate that the WRITE command was completed successfully.

READ Command

Next, the process carried out by the controller when a READ command is received is explained with reference to FIGS. 6 and 9. FIG. 9A illustrates a first example of a READ command 196-A that includes a LBA 1961 and number of blocks (BLK) 1962. In the example of FIG. 9A, the host computer would like to read 512 bytes of data (1 block data) on LBA "9".

Step 620: If the command is a READ command, then the process goes to step 622. If the process is not a READ command, then the process ends at Step 699.

Step 622: The process gets LBA 1961 and BLK (number of blocks) 1962 from the READ command. In this case, LBA is "9" and BLK is "1".

Step 624: The process calculates "S" and "B", where "S" is the segment number of a segment 193 in volume 111, and "B" is the physical block position in the segment. In this embodiment, physical block size is 512 bytes, and segment size and chunk size are 2048 bytes. "S" is calculated by a two-bit right shift, and "B" is calculated by two-bit mask. Accordingly, in this example, "S" is equal to "2" and "B" is equal to "1".

Step 626: The process determines whether a chunk has been allocated for the segment by referring to the chunk table

169. If a chunk has been allocated, then the process locates the chunk corresponding to the segment by referring the chunk table 169. If a chunk has not yet been allocated, then the process goes to step 650. In this case, assuming FIG. 4 is the current chunk table 169, then segment 2 has already had chunk "10000" allocated to it from the chunk pool 110.

Step 628: The process transfers data that is stored in the physical block in the identified chunk. In this case, "B" is equal to "1", so data in the second block in the chunk "10000" is returned to the host computer in response to the READ command.

Step 630: The process adds one to the LBA in the READ command and subtracts one from the BLK in the READ command.

Step 632: The process checks whether BLK is equal to zero. If BLK is equal to zero, then the process goes to step 690. If BLK is not equal to zero yet, then the process goes back to step 624 to read the next block of data. In this case, BLK is equal to zero.

Step 690: The process responds to the host computer that the READ command has been completed successfully.

Next, FIG. 9B illustrates another example of a READ command 196-B. In this case, the host computer would like to read 512 bytes of data (1 block of data) on LBA "0".

Step 620: If the command is a READ command, then the process goes to step 622; otherwise, the process goes to Step 699.

Step 622: The process gets the LBA 1961 and number of blocks (BLK) 1962 from the READ command 196-B. In this case, LBA is "0", BLK is 1.

Step 624: The process calculates "S" and "B". In this case, the segment "S" is 0 and the physical block "B" is 0.

Step 626: The process determines whether a chunk has been allocated already to segment "0" by referring the chunk table 169. If a chunk has not allocated yet, then the process goes to step 650. In this case, assuming that FIG. 4 is the current chunk table 169, then chunk table 169 shows that a storage chunk has not yet been allocated to segment "0".

Step 650: Since a chunk is not allocated for the designated segment, the controller transfers the default void data pattern that is stored in the default data pattern table 167.

Step 630: The process adds one to LBA and subtracts one from BLK.

Step 632: The process checks whether BLK is zero. In this case, BLK is equal to zero, so the process goes to Step 690.

Step 690: The controller sends a response to the requesting computer indicating that the READ command is complete. Thus, as mentioned above, if the host computer tries to read data on a LBA where a chunk has not yet been allocated, the storage apparatus 100 responds with void data (i.e., null data) in a default data pattern, as specified by the default data pattern table 167.

Backup Process

Figure 10:
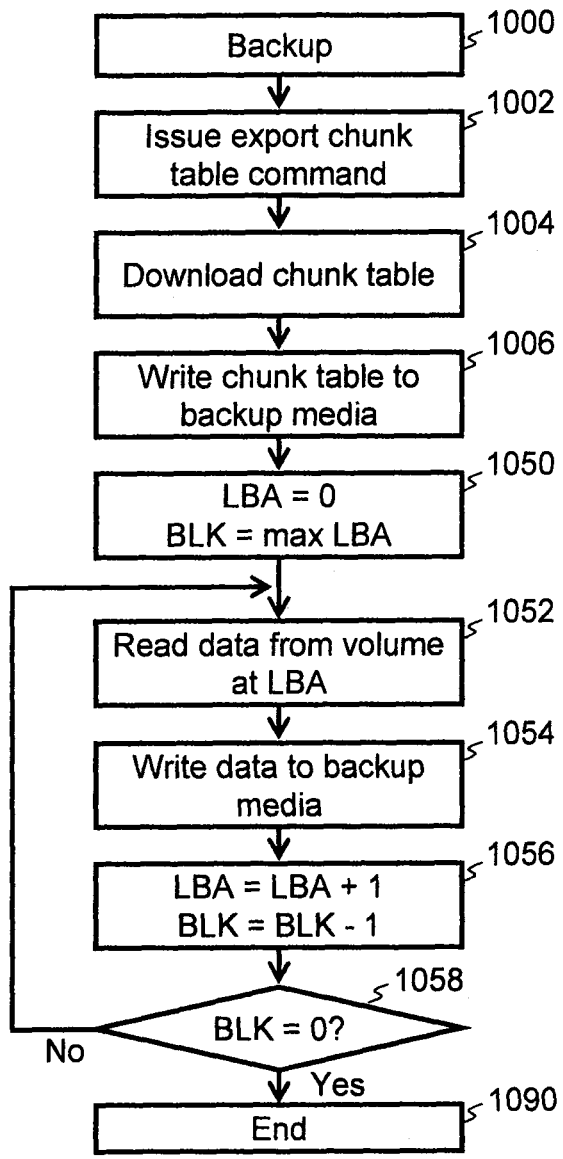
FIG. 10 illustrates a backup process flow in the backup/restore program of the first embodiments.
Figure 11:
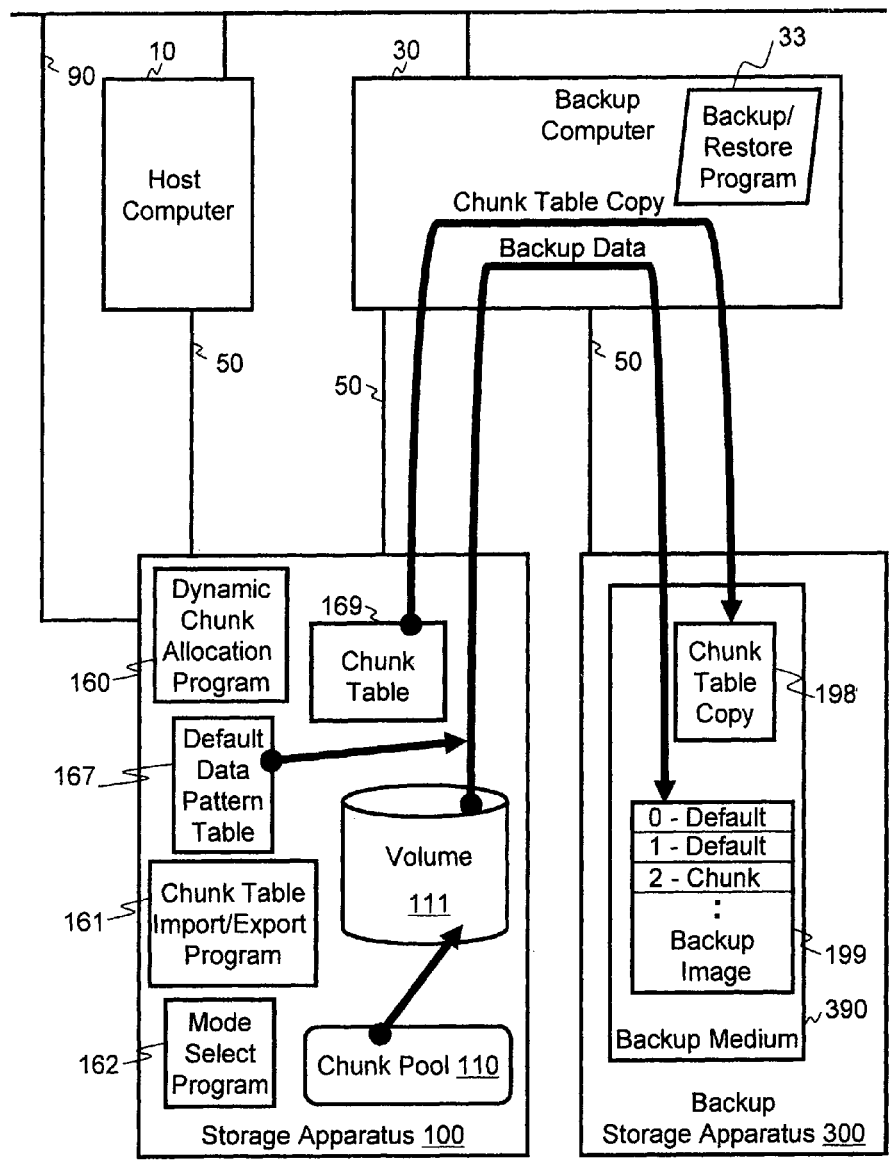
FIG. 11 illustrates a conceptual diagram of the backup process in the first embodiments and an arrangement of the chunk table and the backup image on the backup medium.

FIG. 10 illustrates a backup process flow carried out by execution of the backup/restore program 33 in the backup computer 30. In the first embodiments, the backup computer 30 backs up the volume 111 to the backup medium 390 in the backup storage apparatus 300. FIG. 11 illustrates a conceptual diagram of the backup process and an arrangement of the backed up data. In this example, if the backup medium 390 is a tape medium, it is assumed that the tape medium has already been mounted on the tape device.

Step 1000: The backup process is initiated to obtain a point-in-time backup image of the data in volume 111 as the data exists at the point in time when the backup is initiated. This may be done on a periodic basis, or due to some other triggering event, such as by instruction of a user or administrator.

Step 1002: The process issues an "export chunk table" command to the chunk table import/export program 161 in the storage apparatus 100 in order to obtain a copy 198 of the chunk table 169 for a volume 111 that is to be backed up.

Step 1004: The process downloads the chunk table copy 198 for the specified volume 111 from the storage apparatus 100.

Step 1006: The process writes the downloaded chunk table copy 198 to the backup medium 390 on the backup storage apparatus 300.

Step 1050: The process then prepares to backup a copy of the volume 111 by reading the volume from the first LBA in the volume to the last LBA in the volume. Thus, initially, the first LBA for the volume is zero, and BLK is equal to the maximum (last) LBA.

Step 1052: The process reads data from the volume in the storage apparatus 100 using a READ command.

Step 1054: The process receives the volume data and writes the volume data to the backup medium 390 on the backup storage apparatus 300, thereby creating a backup image 199. As also illustrated in FIG. 11, assuming that the chunk table 169 illustrated in FIG. 4 is the current chunk table, then for the first two segments (segments "0" and "1") of volume 111, since no chunks have yet been allocated for these segments, storage apparatus 100 returns the default void data pattern of table 167 to backup computer 30. However, for segment 2, since chunk 10000 has been allocated to this segment, storage apparatus 100 returns the data stored in chunk 10000.

Step 1056: The process adds one to the LBA and subtracts one from BLK for each block read.

Step 1058: The process checks whether BLK is equal to zero yet. If BLK is not zero, then the process goes back to step 1052.

Step 1090: The process ends when BLK equals zero and the backup image 199 on the backup medium 390 is completed. The backup storage apparatus maintains a relationship between the point-in-time chunk table copy 198 obtained from the DCA storage system and the point-in-time backup image 199. In this implementation, they are stored on the same backup medium 390. Further, as is known, numerous such backup images and corresponding chunk table copies may be created on a regular time schedule for backing up volume 111, or by instruction from a user or administrator, for backing up volume 111 at a number of different points in time.

Restore Process

Figure 12:
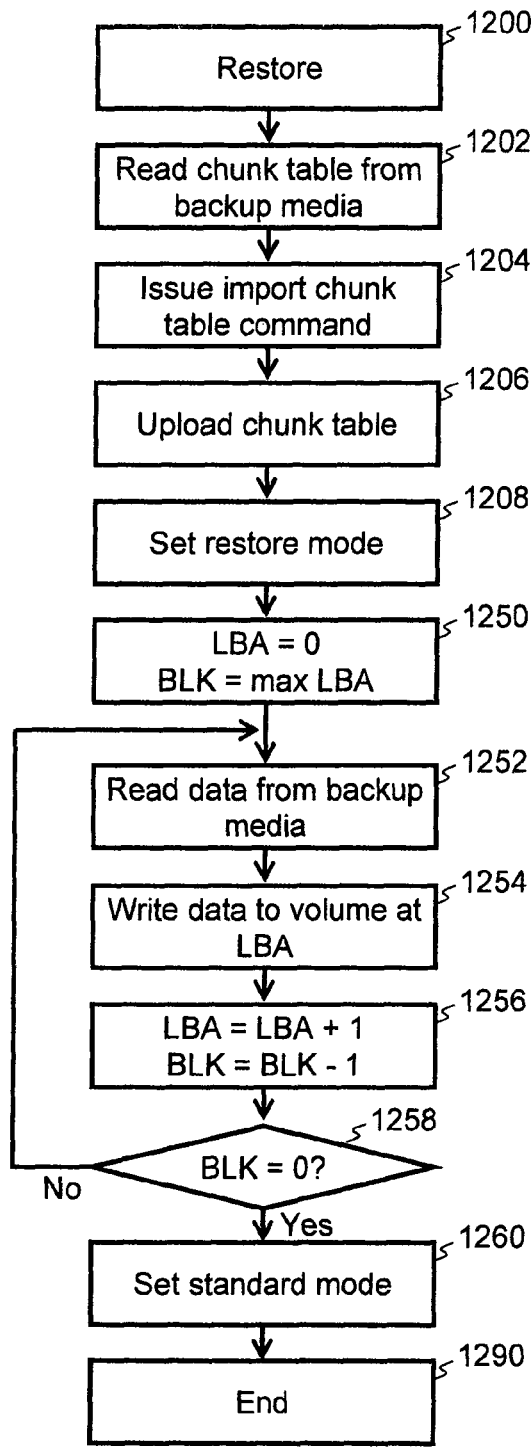
FIG. 12 illustrates a restore process flow in the backup/restore program of the first embodiments.

FIG. 12 illustrates a restore process carried out by execution of the backup/restore program 33 on backup computer 30 when it is necessary to restore volume 111 in the storage apparatus 100. In the first embodiments, the backup computer 30 restores the backup image 199 contained in the backup medium 390 to the volume 111. In the case where the backup medium 390 is a tape, it is assumed that the correct tape medium 390 has already been mounted in the tape device in backup storage apparatus 300.

Step 1200: The restore operation is initiated to restore volume 111 to storage apparatus 100 using the saved backup image 199. The restore process restores the data in volume 111 to a condition of the data at a point in time at which the backup image 199 and chunk table copy 198 were created.

Step 1202: The process reads the chunk table copy 198 from the backup medium 390 on the backup storage apparatus 300.

Step 1204: The process issues an "import chunk table" command to the chunk table import/export program 161 in the storage apparatus 100.

Step 1206: The process sends the chunk table copy 198 to the storage apparatus 100, which sets the imported chunk table copy as the current chunk table 169 for volume 111. This frees the previously allocated chunks in storage apparatus, and the imported chunk table copy will be used to determine which segments of the volume should have chunks allocated during the restore process.

Step 1208: The process sets the storage apparatus 100 to "restore" mode by issuing a command to the mode select program 162. In the restore mode, as in the backup mode discussed below, the host computers 10 are not able to access volume 111 until the mode is switched back to "standard" mode.

Step 1250: Since the backup/restore program 33 restores the volume from top to bottom, the starting LBA is zero, and BLK is equal to the maximum number of LBAs in the volume.

Step 1252: The process reads restore data from the backup image 199 on backup medium 390 on backup storage apparatus 300.

Step 1254: The process writes the restore data to volume 111 in the storage apparatus 100 using one or more WRITE commands, as discussed above.

Step 1256: For each block restored, the process adds one to the LBA and subtracts one from BLK.

Step 1258: The process checks whether BLK has become equal to zero. If BLK is not equal to zero then the process goes back to step 1252 to store the next block.

Step 1260: Once BLK is equal to zero, this indicates that the entire volume has been restored, and the process issues a command to the mode select program 162 to set the mode back to standard mode.

Next, the process carried out in the storage apparatus 100 during the restore operation in the first embodiments is explained.

The chunks (if any) in the existing volume 111 are freed when the import export chunk table program 161 receives the import chunk table command for importing the chunk table copy 198 from the backup computer 30.

The existing chunk table 169 is replaced by the imported chunk table copy 198 when the chunk table copy 198 is imported from the backup computer 30, and the storage apparatus 100 sets this imported chunk table copy 198 as the current chunk table 169 for volume 111.

Next, the process carried out by the storage apparatus dynamic chunk allocation program 160 when receiving a WRITE command from the backup computer 30 in the restore mode is explained by reference to FIG. 7. Steps 700-702 are the same as discussed above.

Step 710: The dynamic allocation program 160 checks the mode to determine whether the mode is "standard" or "restore". In this case, since mode is "restore", the process goes to Step 712.

Step 712: The process checks whether the segment specified in the WRITE command should have a chunk allocated to it by referring to the "IsAllocated" cell 16902 in the chunk table 169 for the segment corresponding to the segment number "S" calculated in step 702. If the cell is not NULL (i.e., if the cell shows that a chunk should be allocated for the segment), then the process goes to step 720 and stores the data included in the WRITE command in the manner describe above for Steps 720-750. On the other hand, if the IsAllocated cell is NULL (not checked), then that means that a chunk was not allocated for the segment in volume 111 at the point in time when volume 111 was being backed up, so the data included in the WRITE command is only the default data pattern, and therefore does not need to be restored. When this is the case, the process does not save the write data and instead goes to step 752 to process the next LBA in the manner described above. Furthermore, if a segment has both valid data and non valid data, such as in the case where some blocks in a segment had data stored to them and other blocks in the segment did not, the non valid data (default data pattern) is restored with the valid data into the allocated chunk.

Thus, in the first embodiments, the point-in-time chunk table copy that is imported back into the storage apparatus 100 is used to manage the restoration of the volume 111. When the storage apparatus is set to the restore mode, the data in a WRITE command from the backup computer is not stored if the WRITE command is directed to a segment that did not have a chunk allocated to it when the backup image was created. This avoids saving the default data pattern to the restored volume 111, and thereby avoids unnecessary allocation and wasting of storage space. Further, in the first embodiments described above, the chunk table is exported to the backup computer 30 and stored to the backup medium 390 with the backup image. However, in another implementation, the chunk table copy 198 may be stored with identification information in the storage apparatus 100 instead of, or in addition to exporting the chunk table copy to the backup medium 390. Thus, in this variation of the first embodiments, during the backup operation, instead of exporting the chunk table 169, a point-in-time copy of the chunk table is stored with identification information, which is given by the backup/restore program 33, and the chunk table is kept in the storage apparatus 100. Then, during the restore operation, instead of having to import the chunk table from the backup computer, a specified point-in-time copy of the chunk table is restored by the storage apparatus. The backup/restore program 33 may provide identification information to the storage apparatus 100 to specify which chunk table copy to restore.

Second Embodiments

Figure 13:
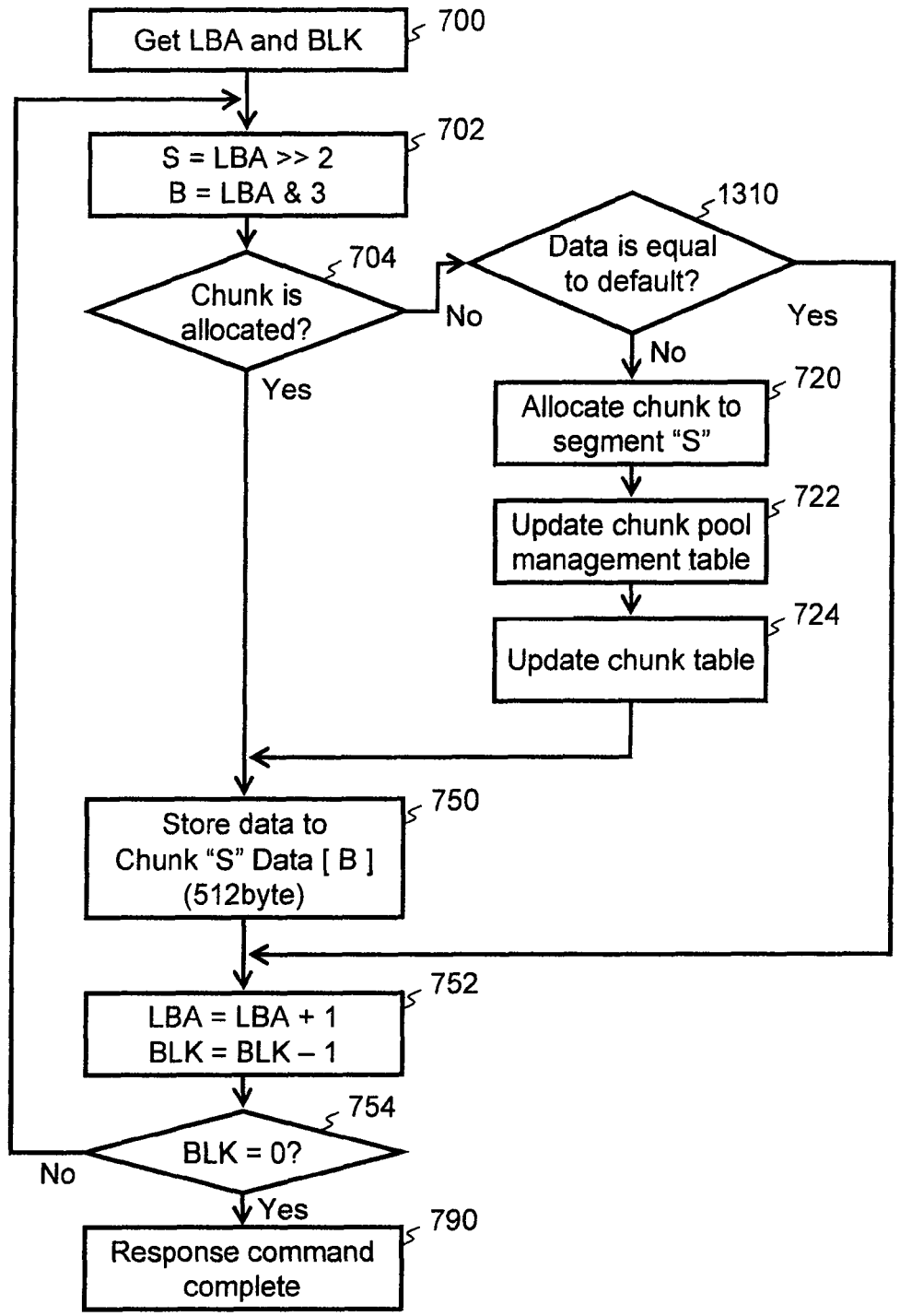
FIG. 13 illustrates a process flow in the dynamic chunk allocation program in the second embodiments of the invention.

The second embodiments can use the same system configuration as described above with respect to FIG. 1A. Accordingly, only the differences in function will be described. FIG. 13 illustrates a process flow carried out by the dynamic chunk allocation program 160 in the second embodiments. In the second embodiments, the default data pattern table 167 may hold, for example, an all-zero data pattern. Although, any other default data pattern can also be applied. Further, each volume may have its own default data pattern table 167, or plural volumes may share the same default data pattern table 167.

In the second embodiments, the DCA storage apparatus 100 includes a "void data" (default data) detecting step in the dynamic chunk allocation program. During a restore operation, when the backup computer restores the backup image, the DCA storage apparatus 100 receives a WRITE command with the restore data, as described above with respect to the first embodiments. However, instead of checking a restored version of the chunk table, a default data detecting step in the dynamic chunk allocation program checks the data itself to determine if the data is a default void data pattern. If the checked data equals the default data pattern, then the DCA storage avoids chunk allocation for that segment of the restored volume.

Figure 17:
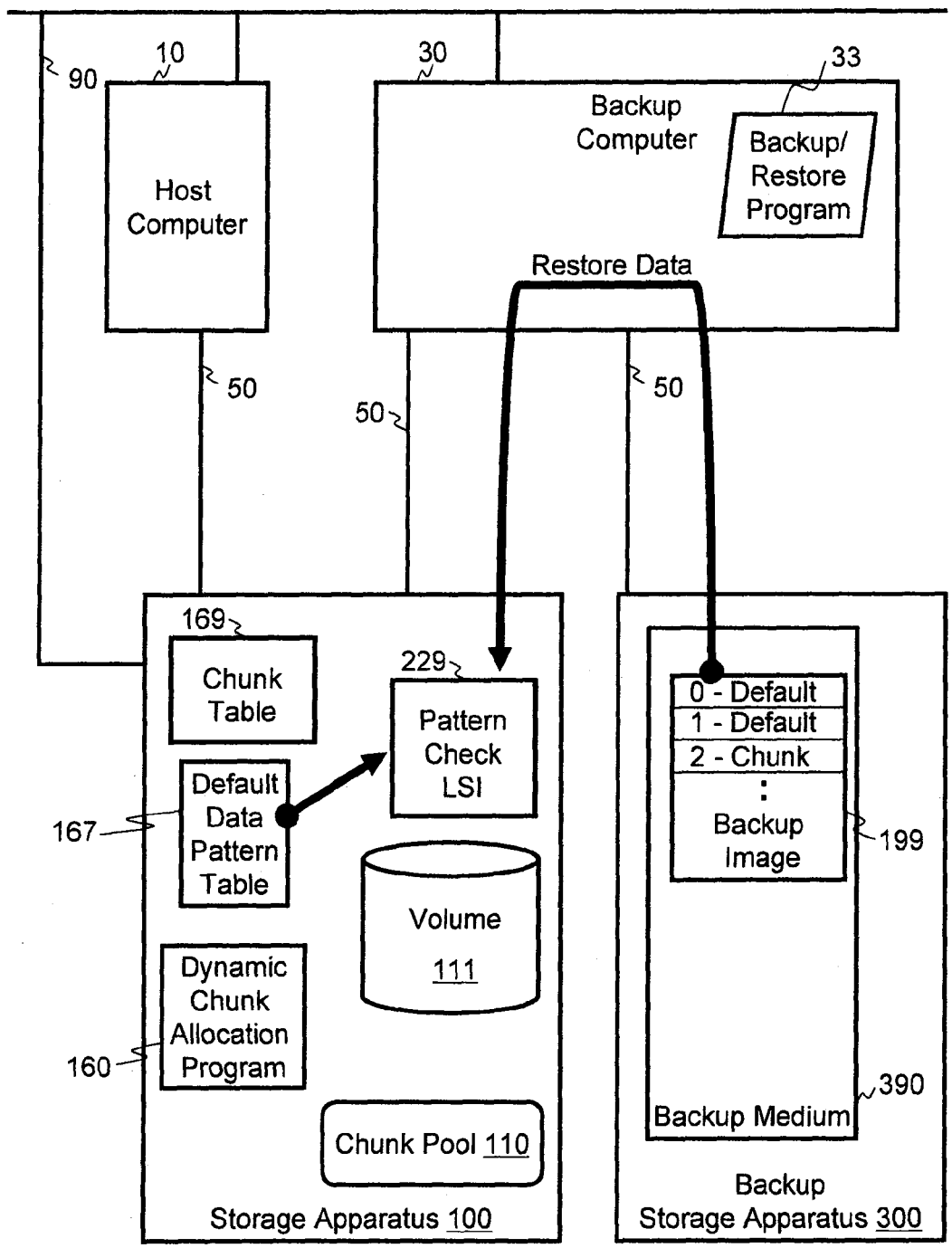
FIG. 17 illustrates a preferred system configuration for the second embodiments of the invention.

The process carried out during backup of volume 111 in the second embodiments is similar to that set forth above in the first embodiments, except that the steps relating to exporting and storing of the chunk table 169 are skipped (i.e., steps 1002, 1004 and 1006 in FIG. 10 are not carried out). The remainder of the backup operation is carried out as described above for Steps 1050-1090. Thus, as illustrated in FIG. 17, in the second embodiments, a backup image 199 of volume 111 is created for a particular point in time, and the backup image includes default void data for segments that did not have chunks allocated to them.

Further, during a restore operation in the second embodiments, it is not necessary for the point-in-time copy of the chunk table to be imported back into the storage apparatus 100 or to set the mode to restore (i.e., Steps 1202-1208 in FIG. 12 are not carried out during the restore operation). The remainder of the restore operation executed by the backup computer is carried out as described above with respect to FIG. 12. Thus, the backup/restore program 33 used in the second embodiments does not need to be modified from conventional software.

In the second embodiments, during a restore operation, the backup computer 30 reads the backup image 199 from the backup storage apparatus 300, and writes the restore data to the storage apparatus 100 as described above with respect to the first embodiments FIG. 12. The processing carried out by storage apparatus 100 during a restore operation when a WRITE command is received from the backup computer by the dynamic chunk allocation program 160 in the second embodiments is set forth in FIG. 13. FIG. 13 includes steps 700-704 and 720-790 which are similar to those described above with respect to FIG. 7, and do not need to be discussed again in great detail. However, in the second embodiments, Steps 710 and 712 are eliminated and additional Step 1310 is included. The procedure carried out in the storage apparatus 100 during a restore operation is as follows.

The chunk table 169 existing for volume 111 may not correspond to the version of volume 111 that is being restored. Accordingly, for the second embodiments, when a restore operation for a volume 111 is initiated, the existing chunk table 169 is cleared and then repopulated as volume 111 is restored. Thus, following a "clear chunk table" command, any chunks currently allocated to volume 111 are freed and the cleared chunk table 169 initially shows that no chunks are allocated to volume 111.

Step 700: The controller gets the LBA and BLK (number of blocks) from the WRITE command received from the backup computer.

Step 702: The controller calculates "S" and "B", where "S" is the segment number corresponding to the LBA designated by the WRITE command and "B" is the physical block position in the segment. During restore, the backup computer will typically restore the volume 111 beginning with the first segment and write segments sequentially to the last segment in the volume. It should be noted however, that the invention is not limited to this order of restoration.

Step 704: The process checks whether the segment referred to by "S" already has a storage chunk allocated by referring to the new chunk table 169 for volume 111. If the specified segment has not yet had a storage chunk 190 allocated for it, then the process goes to Step 1310; otherwise, the process goes to Step 750.

Step 1310: The process checks whether data in the WRITE command is equivalent to the default data pattern in the default data pattern table. If the data is equivalent to the default data pattern then the data does not need to be saved, and the process goes to step 752. If the data is not equivalent to the default data pattern then the process goes to Steps 720-750 for allocating a new chunk to volume 111, updating the chunk pool management table and chunk table, and then storing the write data to the allocated chunk. Steps 752-790 are the same as discussed above in the first embodiments.

Accordingly, in this embodiment, chunk allocation is avoided if data in the WRITE command is equivalent to the default data pattern in the default data pattern table 167. Differences between the first embodiment and the second embodiment are as follows:

Backup

In the second embodiments, the backup/restore program 33 does not need to download a copy of the chunk table when creating the backup image 199. Also, the backup/restore program 33 does not need to write the chunk table to the backup medium. Therefore, chunk table import/export program 161 is not required.

Restore

In the second embodiments, during restore operations, the backup/restore program 33 does not need to read the chunk table from the backup medium, and does not need to send the chunk table to the storage apparatus 100. Also, the backup/restore program 33 does not need to change the mode of the storage apparatus 100 (i.e., between "standard" and "restore"). Accordingly, mode select program 162 is not required.

Additionally, in a preferred configuration of the second embodiments as illustrated in FIG. 17, during the restore operation, the restore data may be directed to a large scale integrated (LSI) circuit 229 which is able to check the data pattern in the data stream. LSI circuit 229 enables a quick hardware-based means for checking for the default data pattern without having to perform a conventional bit-by-bit comparison of the data by software. If the default data pattern is all zeros or all 0xFFs (hexadecimal), then the LSI circuit 229 is able to determine quickly if the data included in the write data matches this default data pattern by XORing (i.e., by applying the exclusive OR function) between write data and the default data pattern (e.g., zero or 0xFF). If the result of the XOR operation is not 0 within a block, then the block is not the default void pattern, and therefore is valid data to be restored. Thus, the performance and efficiency of the restore operation is improved by using LSI circuit 229 (hardware) for checking the validity of the restore data instead of using software running on CPU 151.

Third Embodiments

Figure 14:
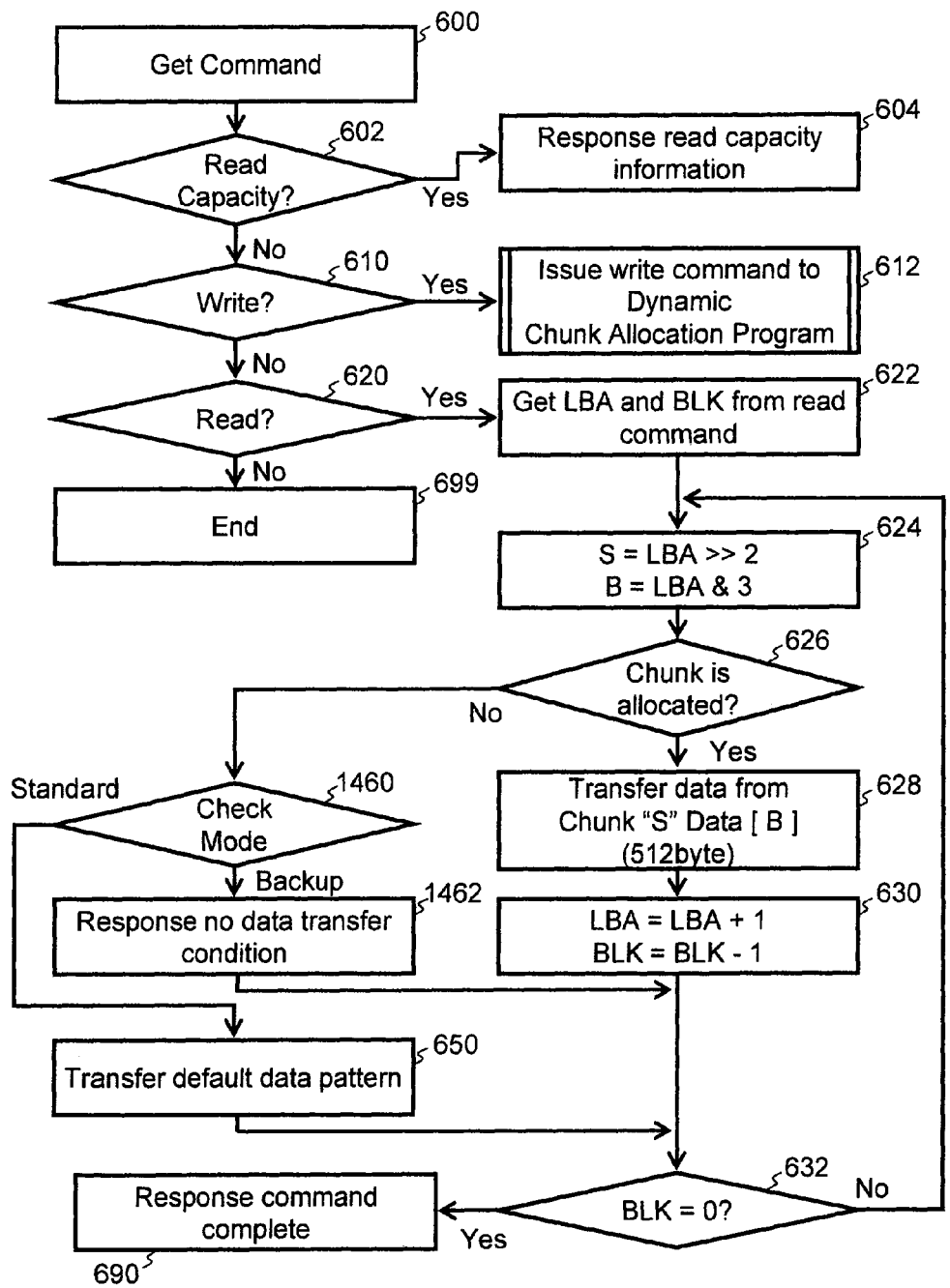
FIG. 14 illustrates a process flow in the response program for the third embodiments.
Figure 15:
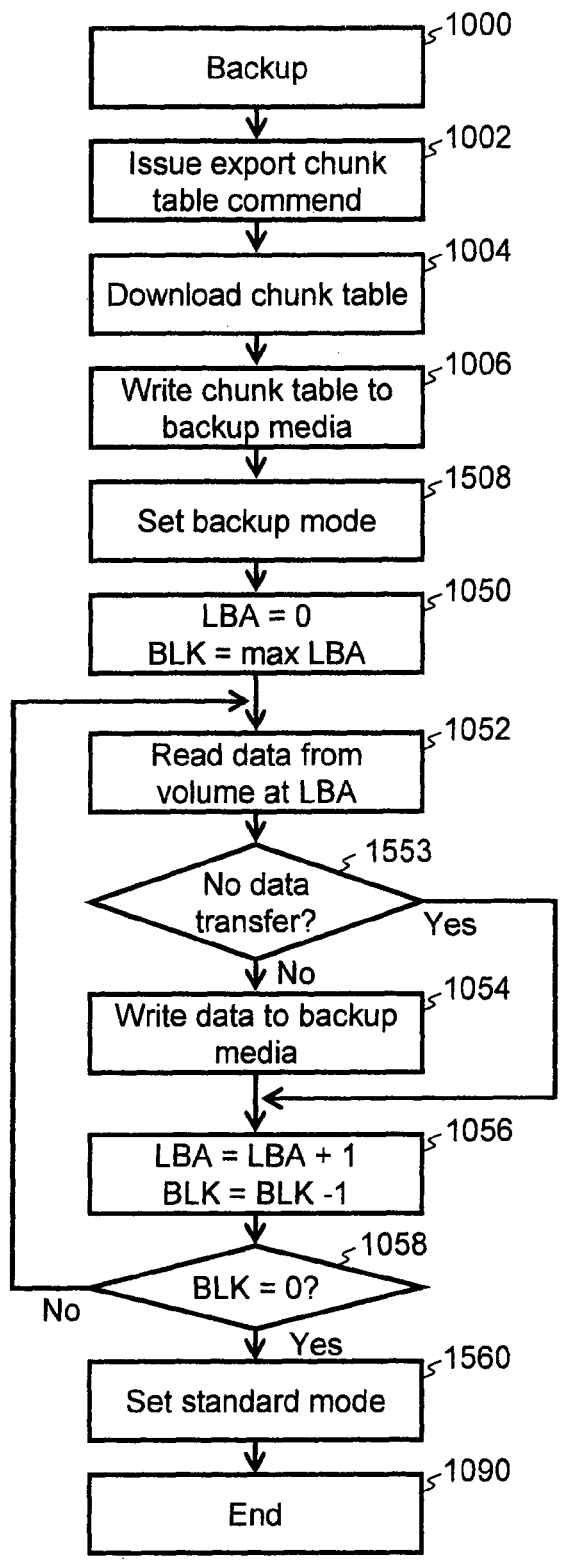
FIG. 15 illustrates a process flow for backup in the backup/restore program for the third embodiments.
Figure 16:
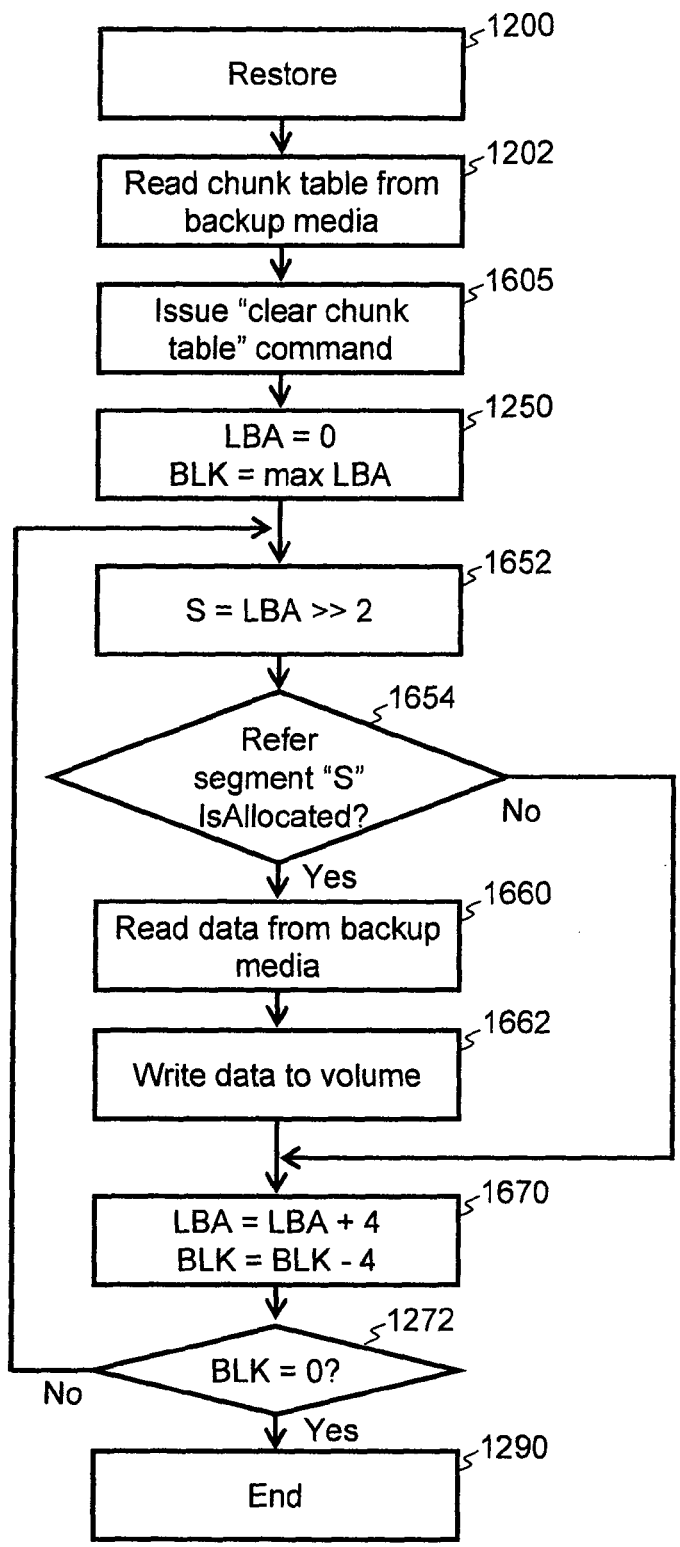
FIG. 16 illustrates a process flow for restore in the backup/restore program of the third embodiments.
Figure 18:
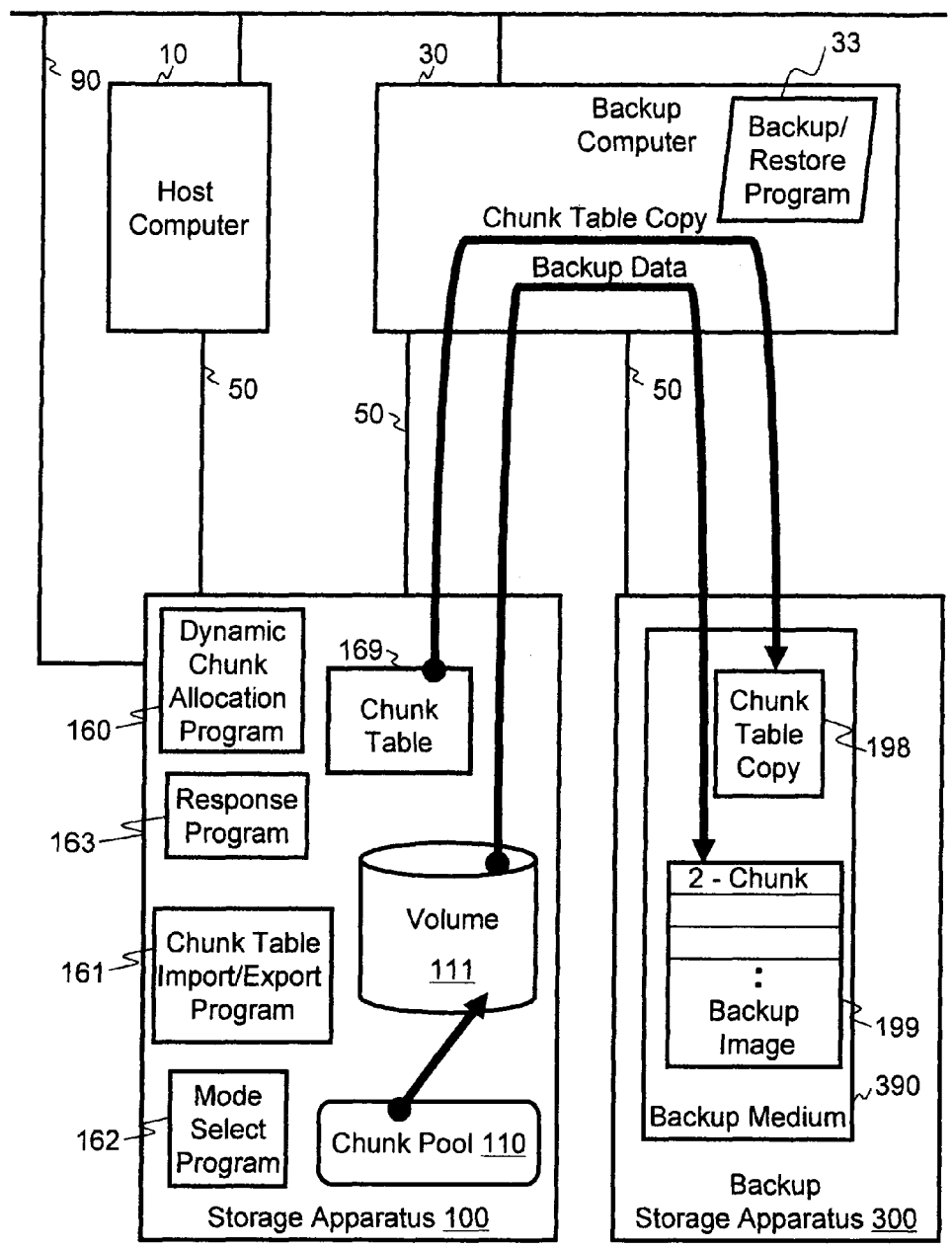
FIG. 18 illustrates a conceptual diagram of the backup operation of the third embodiments.

In the third embodiments, the DCA storage system includes the mode select program 162 and a "no data transfer" step. In these embodiments, the DCA storage apparatus 100 is set to a "backup mode" before beginning a backup operation. In the backup mode, the DCA storage apparatus 100 responds with a no data transfer condition to the backup computer when a read occurs on a segment of the volume that has not yet had storage chunks allocated to it. Then, during a restore operation, data is restored only to segments of the volume that were stored in the backup image. FIG. 14 illustrates a process flow in the response program 163 for the third embodiments, while FIGS. 15 and 16 illustrate the process flow of the backup/restore program 33, with FIG. 15 illustrating the backup operation and FIG. 16 illustrating the restore operation. In addition, FIG. 18 illustrates a conceptual diagram of the backup operation of the third embodiments.

Backup

As illustrated in FIG. 14, in the third embodiments, the response program 163 includes additional Steps 1460 and 1462 when a READ command is received and the storage apparatus is in the "backup" mode. The remainder of the process carried out by the response program is the same as that described above with respect to FIG. 6. Accordingly, description of those steps does not need to be repeated again in detail. Thus, in the third embodiments, when backup of a volume 111 is to be conducted, the storage apparatus 100 is placed into backup mode by instruction from the backup/restore program 33 to mode select program 162. Then, the backup computer reads the data to be backed up from volume 111 using a READ command. Accordingly, Steps 600-626 are the same as described above. When Step 626 is reached, the process determines whether a chunk has been allocated for the specified segment. If a chunk is allocated, the process carries out Steps 628-632, as described above, and sends the requested data to the backup computer for storage to the backup image 199. On the other hand, if a chunk has not been allocated, then the process goes to Step 1460.

Step 1460: The process checks whether the mode is standard mode or backup mode. If the mode is standard mode then that means that the READ command is not for creating a backup image, and the process goes to Step 650 for transferring the default void data pattern to the computer that sent the READ command. On the other hand, if the mode is set to backup, then the process goes to Step 1462.

Step 1462: The storage system's response is no data transfer condition to the backup computer. The process then goes to step 632 and completes as discussed above. Thus, during backup, the default void data pattern is not sent to the backup computer for segments that do not have chunks allocated, and the backup image 199 only includes data for segments having chunks allocated, as illustrated in FIG. 18.

FIG. 15 illustrates a backup process flow in the backup/restore program 33 in the third embodiments. The process carried out in the third embodiments is similar to that described above with respect to FIG. 10 for the first embodiments. Accordingly, the steps that are the same do not need to be described again in great detail. In Steps 1000-1006, the backup computer requests a copy of the chunk table from the storage apparatus 100 at a point in time for creating the back up, and writes the chunk table copy 198 to the backup medium 390 on the backup storage apparatus 300 (see also FIG. 18).

Step 1508: The backup/restore program 33 sets the storage apparatus 100 to backup mode by issuing a command to the mode select program 162. The backup computer then reads data from volume 111 using the READ command, such as by sequentially reading the segments of volume 111, as discussed above for Steps 1050-1052.

Step 1553: If the response to a READ command is a no data transfer condition, then there is no data to be stored for that LBA, and the backup/restore program 33 goes to step 1056 without storing any data for that LBA. On the other hand, if data is returned, then the data is stored to the backup medium, as described above for steps 1054-1058.

Step 1560: Once the entire volume 111 has been read and stored to backup image 199, the process sets the storage apparatus 100 back to standard mode by issuing a command to the mode select program 162, and the backup process is complete. Thus, the backup process of the third embodiments backs up only the chunks of volume 111 that have been allocated to volume 111, and does not save any default data to the backup image 199 (see also FIG. 18). This process saves storage capacity on the backup medium 390, and also increases backup and restore efficiency.

Restore

FIG. 16 illustrates the process flow in the backup/restore program 33 in the third embodiments when restoring a volume 111. The process carried out differs from the first embodiments in the aspects set forth below.

Steps 1200 and 1202 are the same as for the restore operation in the first embodiments described above with respect to FIG. 12. The restore operation is initiated to restore volume 111 to storage apparatus 100 using the saved backup image 199. The process reads the chunk table copy 198 from the backup medium 390 on the backup storage apparatus 300.

Step 1605: The process issues a "clear chunk table" command to the chunk table import/export program 161 in the storage apparatus 100. The chunk table 169 in the storage apparatus 100 is cleared and the chunks in the volume are freed when the import/export chunk table program 161 receives the clear chunk table command. Thus, in the third embodiments, the chunk table copy 198 is not imported into storage apparatus 100. Rather, the chunk table copy 198 is retained in the backup computer 33 and used to manage the restore operation from the backup computer 30, and the chunk table 169 in the storage apparatus 100 is cleared so that it may be used and repopulated as volume 111 is restored.

Step 1250: As described for Step 1250 above, LBA is initially zero and BLK is equal to maximum LBA.

Step 1652: The segment number ("S") is calculated from LBA by using a two-bit right shift.

Step 1654: The process refers to the chunk table copy 198 stored in backup computer memory 32 to determine whether a chunk is allocated for the calculated segment "S". If the "IsAllocated" cell of chunk table copy 198 corresponding to the current segment "S" shows that a chunk was not allocated to that segment, then the process skips to Step 1670. On the other hand, if the "IsAllocated" cell of the chunk table copy 198 shows that a chunk was allocated for that segment, the process goes to Step 1660 to restore the corresponding data.

Step 1660: The process reads the data from the backup medium 390 on backup storage system 300. In this case, the size of the data that can be read and restored is 2048 bytes (i.e., one segment, four blocks per a segment, and 512 bytes per segment) according to the example embodiment, since a segment either has a chunk allocated to it or not.

Step 1662: The restore data is written to the storage apparatus 100, which allocates a new chunk and stores the data according to a standard WRITE command, as set forth above with respect to FIGS. 6 and 7.

Step 1670: The process adds the blocks per segment (four) to the current LBA, and subtracts the blocks per segment (four) from the current BLK.

Step 1272: The process checks whether or not BLK has become zero. If so, then the volume restoration is complete and the process ends at Step 1290; if not then process returns to step 1652.

From the foregoing, it may be seen that the invention provides for backup and restore ability for volumes in storage systems that are able to allocate storage capacity as the capacity is used. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of reading and writing data in an information system having a storage apparatus having one or more disk drives and a controller for providing a volume for storage, the volume being logically divided into multiple segments to which chunk data are able to be independently allocated, wherein the information system manages first chunk information to identify whether or not each segment is allocated to chunk data, the method comprising the steps of:

in a backup process,
transferring the first chunk information from the storage apparatus to a backup storage apparatus,
checking the first chunk information to identify whether each segment is allocated to chunk data or not,
if a segment is allocated to chunk data, transferring data read out from the segment to the backup storage apparatus, and
if a segment is not allocated to chunk data, transferring neither default void pattern data nor data stored in the segment to the backup storage apparatus; and in a restore process,
checking the first chunk information transferred from the storage apparatus to the backup storage apparatus to identify whether each segment is allocated to chunk data or not,
if a segment is allocated to chunk data, restoring data from the backup storage apparatus to the storage apparatus, and
if a segment is not allocated to chunk data, transferring neither default void pattern data nor data from the backup storage apparatus to the storage apparatus.

2. The method according to claim 1,
wherein the first chunk information is a copy of second chunk information stored in the storage apparatus, and
in the backup process, the information system deletes the second chunk information in the storage system and uses the first chunk information to restore data.

3. The method according to claim 1,
wherein in the backup process, if a segment is not allocated to chunk data, not transferring any data to the backup storage apparatus.

4. An information system, comprising:
a storage apparatus having one or more disk drives and a controller for providing a volume for storage, the volume being logically divided into multiple segments to which chunk data are able to be independently allocated, and the controller manages first chunk information, acquired based on a command, to identify whether or not each segment is allocated to chunk data;
in a backup process, the first chunk information is transferred from the storage apparatus to a backup storage apparatus, and the information system checks the first chunk information transferred from the storage apparatus to the backup storage apparatus to identify whether each segment is allocated to chunk data or not,
if a segment is allocated to chunk data, transferring data read out from the segment to the backup storage apparatus, and
if a segment is not allocated to chunk data, transferring neither default void pattern data nor data stored in the segment to the backup storage apparatus; and
in a restore process, the information system checks the first chunk information to identify whether or not each segment is allocated to chunk data,
if a segment is allocated to chunk data, the information system restores data from the backup storage apparatus to the storage apparatus, and
if a segment is not allocated to chunk data, the information system transfers neither default void pattern data nor data from the backup storage apparatus to the storage apparatus.

5. The information system according to claim 4,
wherein the first chunk information is a copy of a second chunk information stored in the storage apparatus, and
in the backup process, the information system deletes the second chunk information in the storage system and uses the first chunk information to restore data.

6. The information system according to claim 4,
wherein in the backup process, if a segment is not allocated to chunk data, not transferring any data to the backup storage apparatus.

7. A backup computer coupled to a storage apparatus and a backup storage apparatus, wherein the storage apparatus has one or more disk drives and a controller for providing a volume for storage, the volume being logically divided into multiple segments to which chunk data are able to be independently allocated, the backup computer comprising:
a processor; and
a memory storing first chunk information, acquired based on a command to the storage apparatus, to identify whether or not each segment is allocated to chunk data, the first chunk information having been previously transferred from the storage apparatus to the backup computer based on a command,
the memory further storing instructions that when executed on the processor, instruct the processor, in a backup process and in a restore process, to:
in the backup process, check the first chunk information to identify whether each segment is allocated to chunk data or not,
if a segment is allocated to chunk data, transfer data read out from the segment to the backup storage apparatus, and
if a segment is not allocated to chunk data, transfer neither default void pattern data nor data stored in the segment to the backup storage apparatus; and
in the restore process, check the first chunk information to identify whether or not each segment is allocated to chunk data,
if a segment is allocated to chunk data, restore a data from the backup storage apparatus to the storage apparatus, and
if a segment is not allocated to chunk data, transfer neither default void pattern data nor data from the backup storage apparatus to the storage apparatus.

8. The backup computer according to claim 7,
wherein the first chunk information is a copy of a second chunk information stored in the storage apparatus, and
in the backup process, the backup computer deletes the second chunk information in the storage system and uses the first chunk information to restore data.

9. The backup computer according to claim 7,
wherein in the backup process, if a segment is not allocated to chunk data, not transferring any data to the backup storage apparatus.

* * * * *